United States Patent
Hosamane et al.

(10) Patent No.: US 10,935,093 B2
(45) Date of Patent: Mar. 2, 2021

(54) ACTIVE BRAKE COOLING USING NITROGEN ENRICHED AIR

(71) Applicant: Honeywell International Inc., Morris Plains, NJ (US)

(72) Inventors: Somashekhar M Maheswarappa Hosamane, Bangalore (IN); Sudheendra Karkada Nagesha, Bangalore (IN); Deepak Kumar Jagadeesan, Bangalore (IN); Vadiraja Krishna Upadya, Bangalore (IN); Karthik Sanga, Bangalore (IN)

(73) Assignee: Honeywell International Inc., Charlotte, NC (US)

(*) Notice: Subject to any disclaimer, the term of this patent is extended or adjusted under 35 U.S.C. 154(b) by 259 days.

(21) Appl. No.: 15/940,318

(22) Filed: Mar. 29, 2018

(65) Prior Publication Data
US 2019/0301554 A1    Oct. 3, 2019

(51) Int. Cl.
| | |
|---|---|
| *F16D 65/78* | (2006.01) |
| *F16D 65/847* | (2006.01) |
| *G05D 23/19* | (2006.01) |
| *G05D 7/06* | (2006.01) |
| *B64D 13/00* | (2006.01) |
| *B64C 25/42* | (2006.01) |

(52) U.S. Cl.
CPC .......... *F16D 65/78* (2013.01); *B64D 13/006* (2013.01); *F16D 65/847* (2013.01); *G05D 7/0635* (2013.01); *G05D 23/19* (2013.01); *B64C 25/42* (2013.01); *F16D 2065/783* (2013.01)

(58) Field of Classification Search
CPC .. F16D 65/78; F16D 65/847; F16D 2065/783; B64C 25/42; B64D 13/006; G05D 7/0635; G05D 23/19
See application file for complete search history.

(56) References Cited

U.S. PATENT DOCUMENTS

| | | |
|---|---|---|
| 4,592,452 A | 7/1986 | Merle |
| 6,419,054 B1 | 7/2002 | Schulba |
| 6,419,056 B1 | 7/2002 | Dyko et al. |
| 7,081,153 B2 | 7/2006 | Leigh et al. |
| 7,198,139 B2 | 4/2007 | Wilson et al. |

(Continued)

FOREIGN PATENT DOCUMENTS

CN    105752053 A    7/2016

*Primary Examiner* — Melody M Burch
(74) *Attorney, Agent, or Firm* — Shumaker & Sieffert, P.A.

(57) ABSTRACT

In some examples, a brake cooling system including a brake assembly including at least one brake pad configured to deaccelerate the vehicle during an active braking procedure, a controller configured to monitor a temperature of the at least one brake pad, an onboard inert gas generation system (OBIGGS) configured to receive air and produce a nitrogen enriched air (NEA), a NEA supply conduit connected to the OBIGGS and configured to deliver the NEA from the OBIGGS to the brake assembly, and a NEA control valve coupled to the NEA supply conduit. The controller, in response to detecting the temperature of the at least one brake pad exceeds a threshold value during the active braking procedure, operates the NEA control valve to control the flow of the NEA passing through the NEA supply conduit and delivered to the at least one brake pad.

19 Claims, 5 Drawing Sheets

(56) References Cited

U.S. PATENT DOCUMENTS

| | | | |
|---|---|---|---|
| 7,469,528 B2 | 12/2008 | Lardellier | |
| 9,573,567 B2 | 2/2017 | Kirkbride et al. | |
| 9,623,982 B2 | 4/2017 | Sharma | |
| 2005/0115404 A1* | 6/2005 | Leigh | B01D 53/0454 95/11 |
| 2005/0286054 A1* | 12/2005 | Chen | G01N 21/3504 356/437 |
| 2011/0147519 A1* | 6/2011 | Scott | F16D 65/0025 244/110 A |
| 2014/0094884 A1* | 4/2014 | Zaidi | A61F 7/02 607/107 |
| 2014/0239121 A1 | 8/2014 | Kirkbride et al. | |
| 2015/0136902 A1* | 5/2015 | Green | B64C 25/62 244/103 R |
| 2015/0323023 A1* | 11/2015 | Yamaguchi | F16D 57/02 188/1.11 E |
| 2016/0200446 A1* | 7/2016 | Sharma | B64D 13/02 62/646 |
| 2016/0206995 A1* | 7/2016 | Rugg | B01D 53/66 |
| 2018/0237884 A1* | 8/2018 | Crafton | C21D 9/0025 |

* cited by examiner

ACTIVE BRAKE COOLING USING NITROGEN ENRICHED AIR

TECHNICAL FIELD

The disclosure relates to brake pad assemblies for vehicles and mechanisms for cooling such brake pad assemblies.

BACKGROUND

Brake pads for vehicles are conventionally made using ceramic (e.g., carbon composite materials) or high strength metals (e.g., steel). During active braking procedures, the brake pads are engaged to slow the speed of the vehicle. The engagement of the brake pads produces friction between the plates causing the temperatures of the components to increase. Operating such brake pads at increased temperatures may increase the amount of wear on the brake pad thereby reducing the useful life of the brakes. In the context of aerial vehicles, once an aircraft has landed, regulation may require that the temperature of the brake pads be reduced to a nominal temperature before operation of the aircraft may be resumed.

SUMMARY

In some examples, the disclosure describes brake cooling systems for aerial vehicles that may be utilized during active braking procedures to remove heat from brake pads. In some examples the described techniques utilize nitrogen enriched air (NEA) readily available from an onboard inert gas generation system to not only cool the brake pads but also reduce the amount of oxidation that occurs on the brake pads.

In some examples, the disclosure describes a brake cooling system for a vehicle that includes a brake assembly including at least one brake pad configured to deaccelerate the vehicle during an active braking procedure, a controller configured to monitor a temperature of the at least one brake pad, an onboard inert gas generation system configured to receive air and produce a nitrogen enriched air (NEA) including at least about 90% nitrogen by volume, a NEA supply conduit connected to the onboard inert gas generation system, the NEA supply conduit configured to deliver the NEA from the onboard inert gas generation system to the brake assembly, and a NEA control valve coupled to the NEA supply conduit, the controller configured to operate the NEA control valve to control a flow of the NEA passing through the NEA supply conduit. The controller, in response to detecting the temperature of the at least one brake pad exceeds a threshold value during the active braking procedure, configured to operate the NEA control valve to control the flow of the NEA passing through the NEA supply conduit and delivered to the at least one brake pad.

In some examples, the disclosure describes a method of active brake cooling for a vehicle. The method including performing an active braking procedure on a vehicle using a brake assembly including at least one brake pad configured to deaccelerate the vehicle during the active braking procedure, detecting, by a controller of a brake cooling system, a temperature of the at least one brake pad exceeding a threshold temperature during the active braking procedure, generating a nitrogen enriched air (NEA) including at least about 90% nitrogen by volume using an onboard inert gas generation system configured to receive air and produce the NEA, and delivering the NEA to the at least one brake pad in response to detecting by the controller the at least one brake pad exceeding the threshold value. The brake cooling system includes a NEA supply conduit connected to the onboard inert gas generation system and a NEA control valve coupled to the NEA supply conduit. Delivering the NEA includes operating, by the controller, the NEA control valve to control a flow of the NEA passing through the NEA supply conduit to deliver the NEA to the at least one brake pad.

In some examples, the disclosure describes a brake cooling system for a vehicle that includes an onboard inert gas generation system configured to purify nitrogen gas in a compressed air to produce a nitrogen enriched air (NEA) including at least about 90% nitrogen by volume, a brake assembly including at least one brake pad configured to deaccelerate the vehicle during a landing procedure, at least one thermal sensor associated with the at least one brake pad, a controller configured to monitor a temperature of the at least one brake pad using the at least one thermal sensor, a NEA supply conduit connected to the onboard inert gas generation system, the NEA supply conduit configured to deliver the NEA from the onboard inert gas generation system to the brake assembly, and a variable flow NEA control valve coupled to the NEA supply conduit, the controller being configured to operate the NEA control valve to regulate a flow rate of the NEA passing through the NEA supply conduit. The controller, in response to detecting the temperature of the at least one brake pad exceeds a threshold value during the landing procedure, configured to operate the NEA control valve to regulate the flow rate of the NEA passing through the NEA supply conduit and deliver the NEA to the at least one brake pad to remove heat from the at least one brake pad.

The details of one or more examples are set forth in the accompanying drawings and the description below. Other features, objects, and advantages of the disclosure will be apparent from the description and drawings, and from the claims.

DETAILED DESCRIPTION

This disclosure describes example techniques and systems that may be used during active braking (e.g., while the vehicle is in motion) to cool vehicle brakes and brake assemblies that are used to slow the speed of the vehicle (e.g., an aircraft). The cooling techniques and systems described below utilize an onboard inert gas generation system and a nitrogen enriched air as a cooling gas to actively cool brake components, e.g., by distributing the nitrogen enriched air over one or more brake pads. In some examples, the described systems may be used in an aerial vehicle during landing, takeoff, or taxiing procedures to maintain the relative surface temperature of one or more of the brake pads within a preset temperature range to ensure optimal performance or reduced wear of the brake pads and surrounding components of the wheel and brake assembly.

The term "cooling" or "cooling gas" is used to indicate that gas (e.g., the nitrogen enriched air) removes heat from another component (e.g., the brake pads) and does not necessarily mean that the relative temperature of the component is simultaneously decreased. In some examples depending on the rate of heat generation and the rate of heat removal by the cooling gas, the relative temperature of the component to be cooled may still increase even though the cooling gas is functioning to remove heat from the system.

Figure 1A:
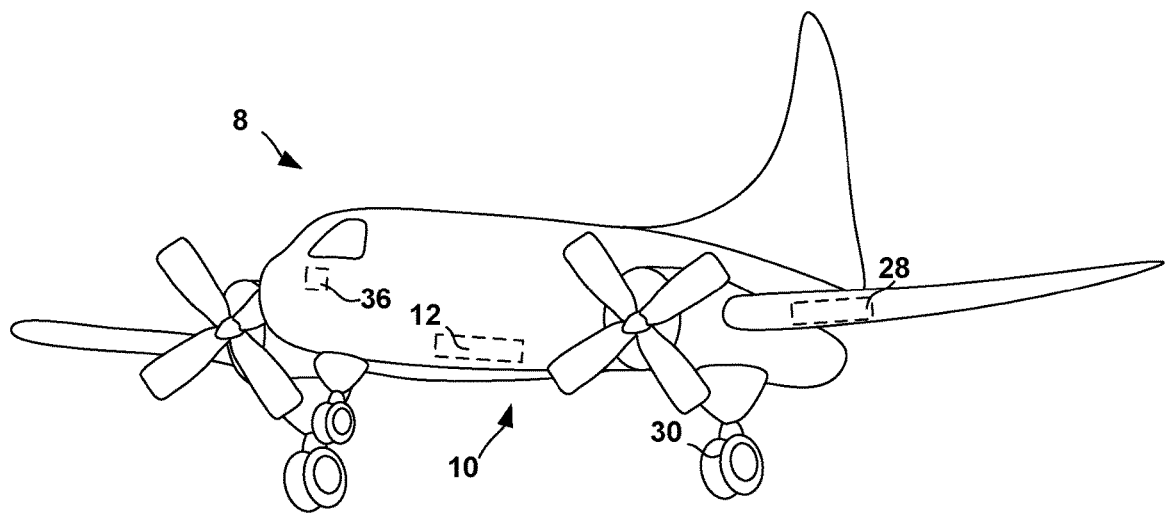
FIGS. 1A and 1B are conceptual diagrams illustrating an example brake pad cooling system for a vehicle.
Figure 1B:
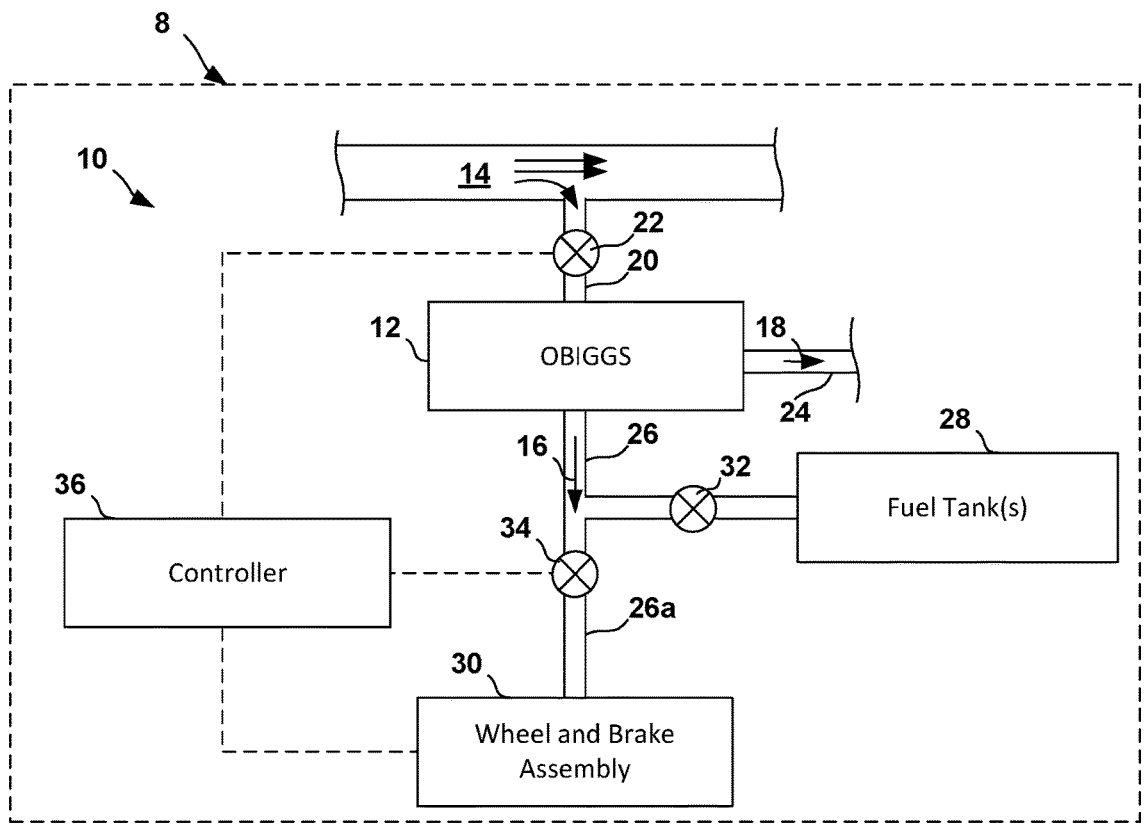

FIGS. 1A and 1B are conceptual diagrams illustrating an example brake pad cooling system 10 for a vehicle 8 that includes an onboard inert gas generation system (OBIGGS) 12, also referred to as a nitrogen generation system (NGS), that receives air 14 (e.g., compressed air) and separates the nitrogen and oxygen content in the air to produce separate streams containing an NEA 16 and an oxygen enriched stream 18.

OBIGGS 12 is onboard vehicle 8 meaning it is installed on vehicle 8 remains as a fixture of vehicle 8 during all operations of vehicle 8, such as during flight operations, as opposed to only being connected or used with vehicle 8 while the vehicle is stationary. OBIGGS 12 may be used to actively produce a supply of NEA 16 onboard vehicle 8 during normal operations as opposed to a supply of NEA 16 provided via alternative means (e.g., pre-filled storage tanks having a finite supply of NEA). While FIG. 1A illustrates and the accompanying description primarily describes vehicle 8 as aerial vehicle for ease of description, the operation of brake pad cooling system 10 may be incorporated into any vehicle that may benefit from the active brake cooling techniques described. Example vehicles 8 may include, for example, aerial vehicles fixed-wing or rotary-wing aircraft, spacecraft, or other type of flying devices; land-based vehicles such as automobiles, locomotives, military vehicles, or the like.

OBIGGS 12 may be connected to an air-inlet conduit 20 actuated by inlet control valve 22, oxygen supply conduit 24, and NEA supply conduit 26. As described further below, NEA supply conduit 26 may be configured to supply NEA 16 to both fuel tanks 28 and a wheel and brake assembly 30. The control of NEA 16 supplied to fuel tanks 28 and wheel and brake assembly 30 is actuated by control valves 32 and 34 respectfully. Brake pad cooling system 10 also includes controller 36 which may control and operate one or more aspects of brake pad cooling system 10 during an active braking procedure.

Figure 2:
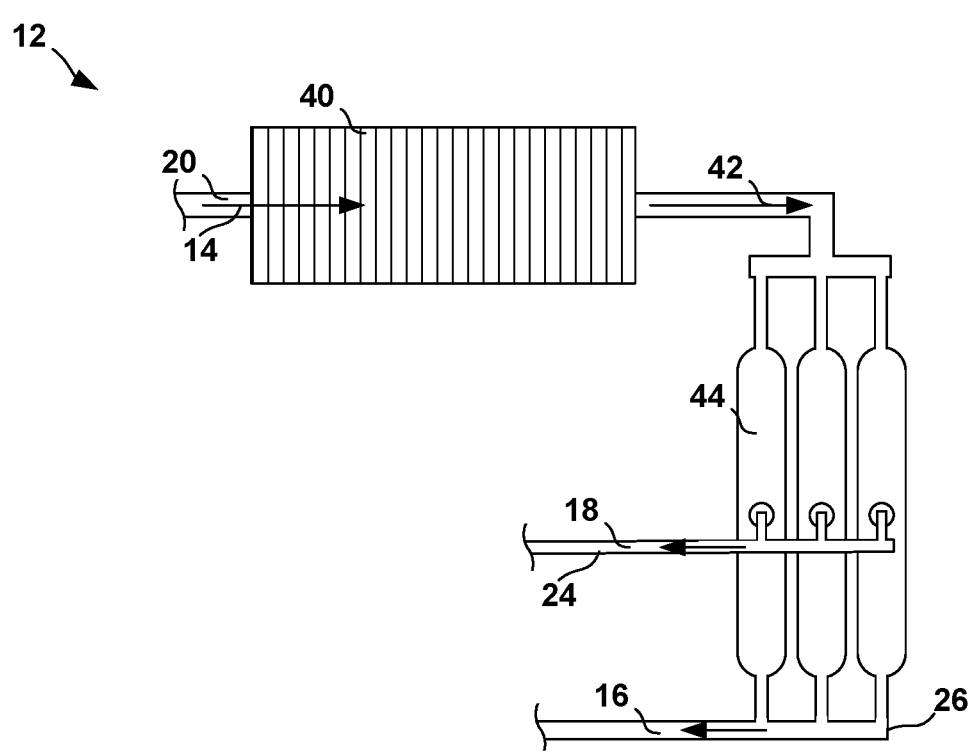
FIG. 2 is a conceptual schematic illustration of an example onboard inert gas generation system that may be used with the brake pad cooling system of FIG. 1.

FIG. 2 is a conceptual schematic illustration of an example OBIGGS 12 that may be used with brake pad cooling system 10. OBIGGS 12 includes air-inlet conduit 20 feeding air 14 through a heat exchanger 40. While air 14 can be from any source on board vehicle 8 including, for example, engine bleed air, bleed air from the aircraft's environmental control system, ram air, or air from an independent compressor, the engine bleed air provides a reliable and continuous source of compressed air that may provide a driving for the oxygen separation. In some examples, air 14 may contain about 21% by volume (vol. %) oxygen ($O_2$), 78 vol. % nitrogen ($N_2$), and traces of argon (Ar), carbon dioxide ($CO_2$), and other gases. Depending on the flight altitude, however, air 14 may have a higher or lower oxygen concentration. In some examples, air 14 may be pressurized (e.g., compressed) between about 150 kPa and about 2200 kPa to provide sufficient driving force to promote the gas separation across gas permeable membranes 44.

Heat exchanger 40 may receive air 14 and cool the air to a desirable target temperature to produce cooled compressed air 42 which is then fed through one or more gas permeable membranes 44. The target temperature selected may depend on the type of permeable membranes 44 used, air flow rate, and initial pressure. In general, the permeability of gas permeable membranes 44 will increase as the temperature of the supply stream increases. Thus, it may preferable for exiting cooled air 42 to have a slightly elevated temperature. In some examples, the temperature of cooled air 42 may be between about 50° C. and about 100° C., for example, about 80° C. Cooled compressed air 42 is then fed through gas permeable membranes 44, which preferentially permeates oxygen from cooled compressed air 42 resulting in separated oxygen enriched stream 18 and NEA 16. In some examples, NEA 16 may be characterized as having a nitrogen concentration of at least 90 vol. %, for example at least about 95 vol. % nitrogen or at least about 98 vol. %. The oxygen enriched stream 18 may exhibit a higher oxygen content than that of air 14 and be used for other purposes such as an oxygen supply for vehicle 8 (e.g., oxygen supply for cabin/cockpit or engine operations) or the like or may be returned to the atmosphere.

Gas permeable membranes 44 may include any suitable membrane material designed to preferentially separate oxygen and nitrogen. Example materials may include, but are not limited to membranes comprising cellulose derivatives, polyimides, polyamide-imides, polyamides, polysulfones, copolymers and blends thereof. In some examples, membranes 44 may include asymmetric or composite hollow fibers. In some examples, membranes 44 may exhibit an oxygen permeance of at least about 10 GPU ($10^{-6}$ $cm^3$/$cm^2 \cdot sec \cdot cm$-hg) and an oxygen to nitrogen selectivity of at least about 4.0 measured at operating conditions.

The exiting NEA 16 may be used as an inert gas source for filling the head space of fuel tanks 28 and brake pad cooling for wheel and brake assembly 30. NEA 16 may be supplied to wheel and brake assembly 30 using NEA supply conduit 26a connected to OBIGGS 12.

In some examples, NEA 16 will have a relative temperature and pressure comparable to cooled compressed air 42 (e.g., a temperature of about 80° C. and a pressure of about 80 psig). The flow rate of NEA 16 to fuel tanks 28, wheel and brake assembly 30, or both may be controlled by adjusting the relative flow rates through one or more of valves 22, 32, and 34. As described further below, the flow rates of NEA 16 may be adjusted via controller 36 depending on the demand requirements for specific operations.

Figure 3:
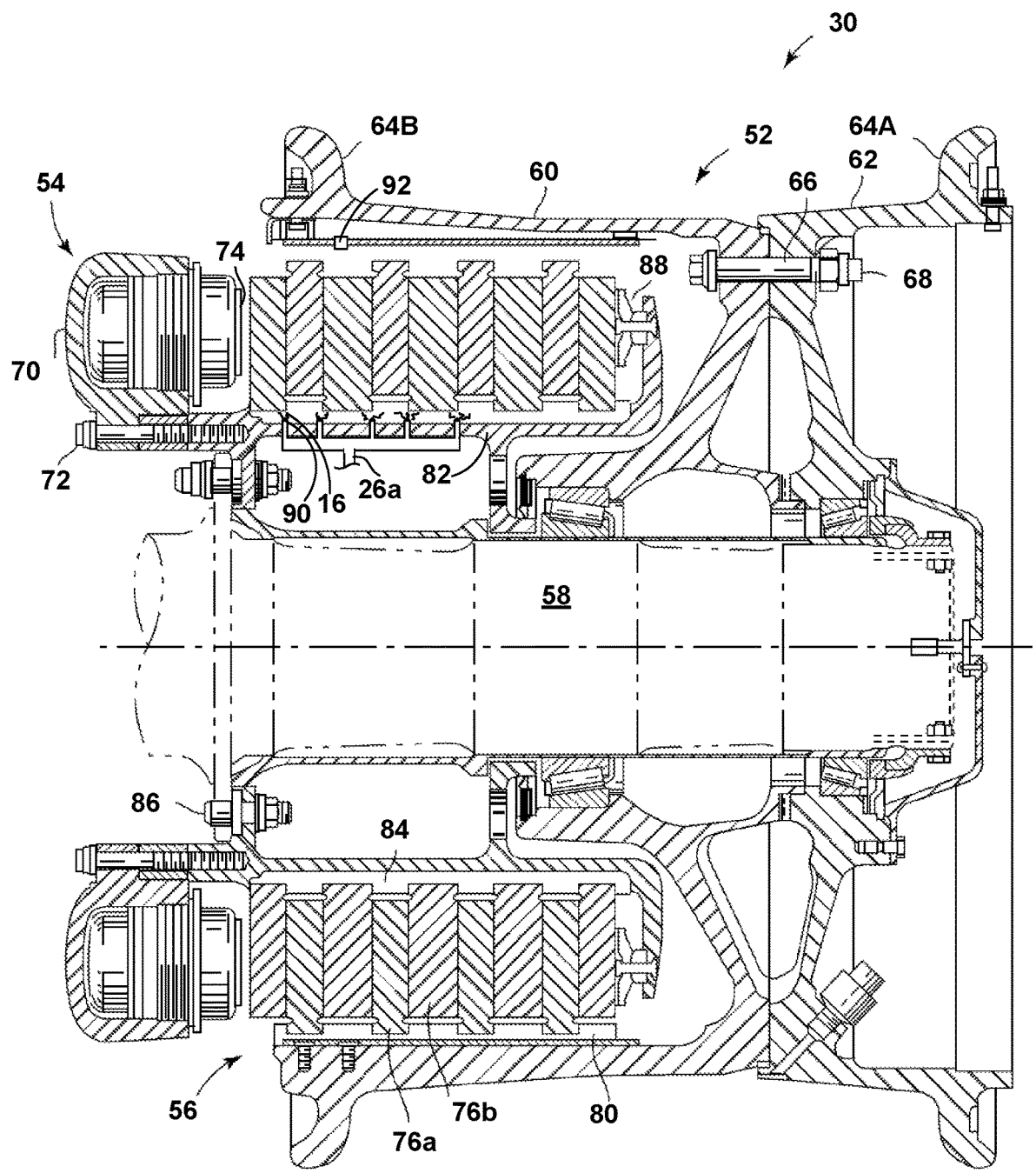
FIG. 3 is a schematic block diagram illustrating an example aircraft brake assembly that may be used with the brake pad cooling system of FIG. 1.

FIG. 3 is a conceptual diagram illustrating an example wheel and brake assembly 30 that may be used with for brake pad cooling system 10. Wheel and brake assembly 30 is provided for illustrative purposes and description. However, other wheel and brake assemblies may be used with for brake pad cooling system 10 different than those shown in FIG. 3 and may include additional or fewer components, one or more brake pads, and may be arranged in different configurations, all of which are envisioned within the scope of this application.

In the example of FIG. 3, wheel and brake assembly 30 includes wheel 52, actuator assembly 54, brake stack 56, and axle 58. Wheel and brake assembly 30 may support any variety of private, commercial, or military aircraft.

Wheel 52 includes wheel hub 60, wheel outrigger flange 62, bead seats 64A and 64B, lug bolt 66, and lug nut 68. During assembly, an inflatable tire (not shown) may be placed over wheel hub 60 and secured on an opposite side by wheel outrigger flange 62. Actuator assembly 54 includes actuator housing 70, actuator housing bolt 72, and ram 74. Actuator assembly 54 may include different types of actuators such as one or more of, e.g., an electrical-mechanical actuator, a hydraulic actuator, a pneumatic actuator, or the like. Brake stack 56 includes alternating rotor discs 76a and stator discs 76b; rotor discs 76a are configured to move relative to stator discs 76b. Rotor discs 76a are mounted to wheel 52, and in particular wheel hub 60, by beam keys 80. Stator discs 76b are mounted to axle 58, and in particular torque tube 82, by splines 84.

Actuator assembly 54 and parts of brake stack 56 may be mounted to an aircraft via torque tube 82 and axle 58. In the example of FIG. 3, torque tube 82 is affixed to axle 58 by a plurality of bolts 86. Torque tube 82 supports actuator assembly 54 and stators 76b. Axle 58 may be mounted on a strut of a landing gear (not shown) to connect wheel and brake assembly 30 to an aircraft.

Brake stack 56 includes alternating rotor discs 76a and stator discs 76b (collectively or individually "brake pads 76" or "brake pad 76"). Rotor discs 76a are mounted to wheel hub 60 for common rotation by beam keys 80. Stator discs 76b are mounted to torque tube 82 by splines 84. In the example of FIG. 3, brake stack 56 includes four rotors and five stators. However, a different number of rotors and/or stators may be included in brake stack 56 in other examples. Further, the relative positions of the rotors and stators may be reversed, e.g., such that rotor discs 76a are mounted to torque tube 82 and stator discs 76b are mounted to wheel hub 60.

During operation of vehicle 8 (e.g., aircraft), braking may be necessary from time to time, such as during landing and taxiing procedures of vehicle 8. Wheel and brake assembly 30 is configured to provide a braking function to vehicle 8 via actuator assembly 54 and brake stack 56. During operation, ram 74 may extend away from actuator housing 70 to axially compress brake stack 56 against compression point 88 for braking. Rotor discs 76a and stator discs 76b may provide opposing friction surfaces for decelerating vehicle 8.

As kinetic energy of a moving vehicle 8 is transferred into thermal energy in brake stack 56, temperatures may rapidly increase in brake stack 56. If left uncontrolled, the temperatures may exceed beyond 200° C. With some aircraft, emergency braking (e.g., rejected takeoff) may result in temperatures in excess of 500° C. and in some cases, even beyond 800° C. As such, rotor discs 76a and stator discs 76b that form brake stack 56 may include robust, thermally stable materials capable of operating at such temperatures.

To handle the increased temperatures associated with vehicle 8 braking, rotor discs 76a and/or stator discs 76b may be formed of materials such as C-C composites or high strength steel that are configured to generally withstand the high braking temperatures associated with normal aircraft braking. While such C-C composites or high strength steel brake pads are configured to withstand such high temperatures, the braking capabilities, and performance of the brake pads may diminish at excessively high temperatures. Additionally, when operated under increased temperatures, the wear on brake pads 76 will exponentially increase resulting in the operating life of brake pads 76 to be diminished.

Other hazards may also arise with increased operational temperatures associated with brake pads 76. For example, as the temperatures of brake pads 76 increases as the result of braking, the surrounding components of wheel and brake assembly 30 will likewise increase in temperature. The increased temperatures of the surrounding components may lead to smoldering or damage to one or more of the components. When combined with dust or runway particulate, the elevated temperatures of wheel and brake assembly 30 may lead to an increased chance of fire or tire failure.

Some of the above-mentioned hazards may be mitigated with certain safe guards such as fusible plugs installed along hub 60 or flange 62. The fusible plugs will melt at certain elevated temperature (e.g., 177° C.) to deflate the tire to avoid excessive pressure build up. However, such safeguards still cause a delay in operational turnaround of vehicle 8 as portions of wheel and brake assembly 30 will need to be replaced.

The elevated temperatures obtained during active braking may be exacerbated depending on the braking situation. For example, refused take offs (RTOs), shorten runways, reverser malfunction, increased aircraft weight (e.g., excess fuel) may all increase the demand on brake pads 76 thereby causing the brake pads to exceed normal operational temperatures.

In some examples, brake stack 56 may be cooled via air circulation (e.g., blower fans) across brake pads 76 activated by the pilot from the cockpit when vehicle 8 is stationary. Using ambient air as the cooling gas, however, introduces a relatively large concentration of oxygen across the heated surfaces of brake pads 76. Such cooling gas, combined with the elevated temperatures of brake pads 76, may lead to unwanted oxidative degradation of brake pads 76. Furthermore, the cooling fans do not address the issue of heat buildup during active braking.

In some examples, the cooling gas may be supplied via a stored inert gas supply such as nitrogen or argon. However, such supply systems conventionally require large storage tanks that need to be periodically resupplied. Furthermore, the size and weight constraint of a stored inert gas supply make them unsuitable for including onboard an aircraft and therefore unavailable to be used active braking procedures while vehicle 8 is in motion.

To address one or more of the problems described above, brake pad cooling system 10 may be configured to deliver NEA 16, using NEA supply conduit 26a as a cooling gas to brake pads 76 during one or more active braking procedures such as during landing, takeoff, or taxiing procedures. NEA 16 provides a relatively inert, relatively cool (e.g., compared to temperatures that may be reached by brake pads 76 absent the use of cooling system 10) gas to help dissipate heat generated by brake pads 76. In some examples, NEA 16 may be used to reduce or maintain the relative surface temperature of one or more of brake pads 76 within a preset temperature range to ensure optimal performance or reduced wear of brake pads 76 and surrounding components of wheel and brake assembly 30.

NEA supply conduit 26a may be configured to supply NEA 16 to brake pads 76 via any suitable means. In some examples, NEA supply conduit 26a may terminate with a plurality of gas nozzles 90 configured to distribute NEA 16 across one or more surfaces of brake pads 76 to act as a cooling gas during active braking and sedentary procedures. In some examples, NEA supply conduit 26a, gas nozzles 90, or both may be mounted to torque tube 82 or any suitable position derived from the design of wheel and brake assembly 30. In some examples, nozzles 90 may be distributed to provide relatively uniform dispersion of NEA 16 over plurality of brake pads 76.

In some examples, brake pad cooling system 10 may include one or more thermal sensors 92 associated with wheel and brake assembly 30 to monitor the temperature of one or more of brake pads 76. Thermal sensors 92 may be actively monitored by controller 36 during active braking procedures to provide a real-time reading of the surface temperature of one or more of brake pads 76. Based on the temperature readings provided by thermal sensors 92, controller 36 may then operate inlet control valve 22, NEA control valve 34, or both to adjust the flow rate of NEA 16 supplied to wheel and brake assembly 30 to increase or decrease the amount of cooling NEA 16 supplied to brake pads 76. In some examples, the flow rate of NEA 16 may be adjusted by controller 36 to maintain the temperature of brake pads 76 within a pre-programmed range. As described further below, the pre-programmed range may be adjusted based on the specific type of brake pad (e.g., C-C composite vs steel) or the manufacturer recommendations established for a specific make or model of brake pads to tailor brake cooling system 10 to particular types of aircrafts and wheel and brake assemblies 30.

In some examples, thermal sensors 92 may include one or more infrared sensors, thermocouples, thermistors, resistance temperature detectors, semiconductor-based sensors, combinations thereof, or the like. Thermal sensors 92 may be associated with brake pads 76 (e.g., coupled to or adjacent to brake pads 76) and used by controller 36 to determine the relative surface temperatures of one or more of brake pads 76.

Inlet control valve 22 and NEA control valve 34 may include any suitable variable flow valve that can be coupled to and controlled by controller 36 to manage the flow rate of NEA 16. In some examples, the flow rate of NEA 16 may be adjusted to provide a peak flow rate of about 5 lb/min to about 70 lb/min (about 2.3 kg/min to about 32 kg/min).

Controller 36 may include processing circuitry configured to monitor the temperature of one or more of brake pads 76 using thermal sensors 92 and adjust the flow rate of NEA 16 generated by OBIGGS 12 and delivered to wheel and brake assembly 30 by adjusting one or more of control valves 22, 32, 34. The processing circuitry of controller 36 may include one or more processors, including one or more microprocessors, CPUs, CPU cores, GPUs, digital signal processors (DSPs), application specific integrated circuits (ASICs), field programmable gate arrays (FPGAs), a mixed-signal integrated circuits, microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. The term "processor" or "processing circuitry" may generally refer to any of the foregoing logic circuitry, alone or in combination with other logic circuitry, or any other equivalent circuitry.

Controller 36 may include one or more memory devices that include any volatile or non-volatile media, such as a RAM, ROM, non-volatile RAM (NVRAM), electrically erasable programmable ROM (EEPROM), flash memory, or the like. The one or more memory devices may store computer readable instructions that, when executed by processing circuitry, cause the processing circuitry to implement the techniques attributed herein to processing circuitry for controlling operations associated with brake pad cooling system 10. Thus, in some examples, controller 36 may include instructions and/or data stored as hardware, software, and/or firmware within the one or more memories, storage devices, and/or microprocessors.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Figure 4:
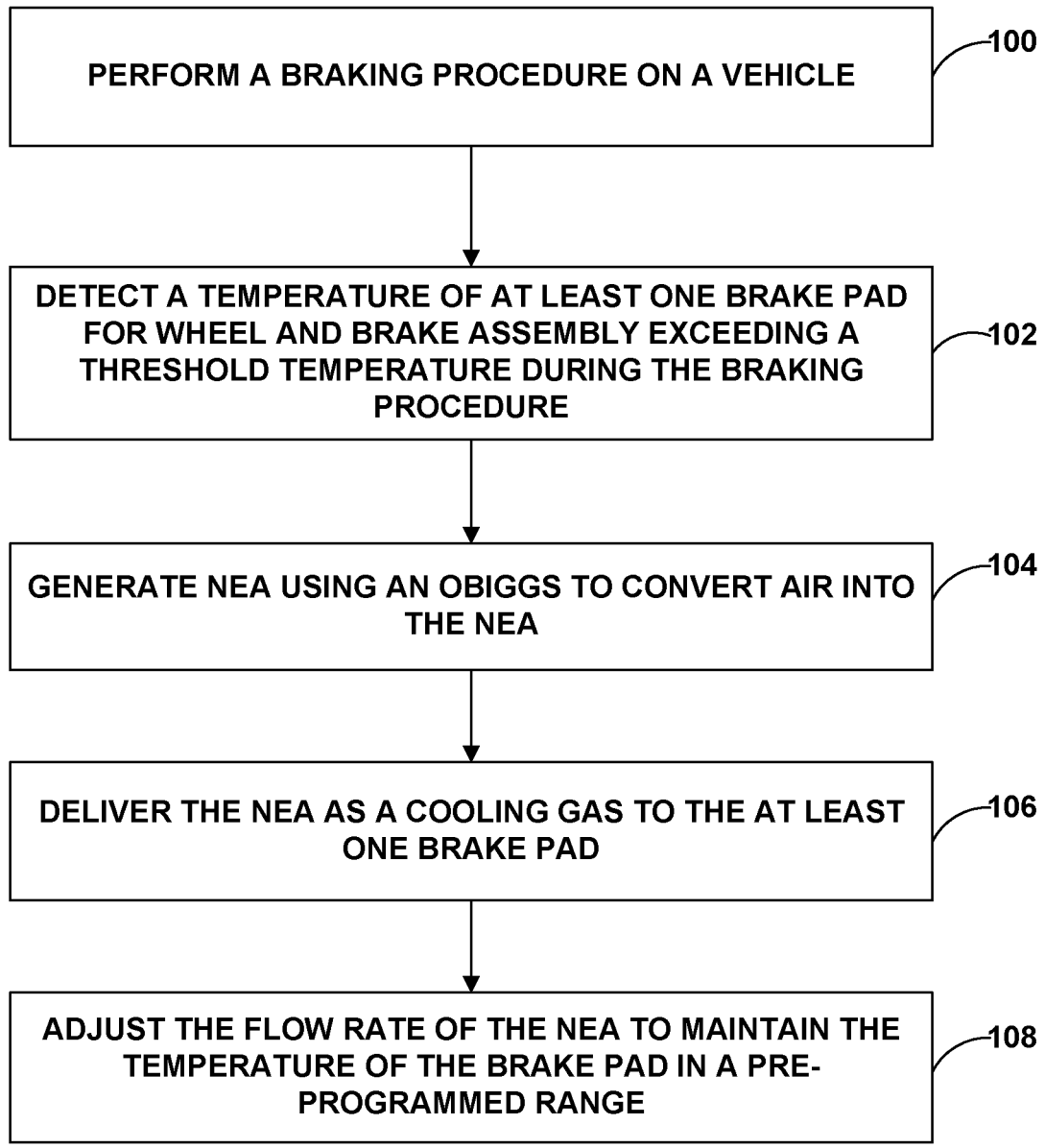
FIG. 4 is a flow diagram illustrating an example technique of active brake cooling.

FIG. 4 is a flow diagram illustrating an example technique of active brake cooling. For ease of illustration, the example of FIG. 4 is described as being performed via brake pad cooling system 10. However, other systems suitable for carrying out the active brake pad cooling are contemplated and brake pad cooling system 10 may be used for additional cooling procedures than those described below.

The technique of FIG. 4 includes performing a braking procedure on a vehicle (100), detecting the temperature of at least one brake pad 76 for a wheel and brake assembly 30 exceeding a threshold temperature during the braking procedure (102), generating NEA 16 using OBIGGS 12 to covert air 14 into NEA 16 (104), deliver NEA 16 as a cooling gas to the at least one brake pad 76 (106), and optionally adjusting the flow rate of NEA 16 to maintain the temperature of brake pad 76 in a pre-programmed range (108).

As described above the braking procedure (100) may be performed on any vehicle 8, such as an aerial vehicle, that includes wheel and brake assembly 30. In some examples the braking procedure may include any active braking procedure in which vehicle 8 is in motion and utilizes the engagement of at least one brake pad 76 to slow the relative speed of vehicle 8. Example active braking procedures may occur during, for example, aborted takeoffs, taxiing, or landing of vehicle 8.

The braking procedure (e.g., landing) will cause the relative temperatures of the at least one brake pad 76 to increase due to the frictional engagement of the brake pad (e.g., between the adjacent brake pads 76a, 76b) to slow the speed of vehicle 8. Using controller 36, brake pad cooling system 10 can actively monitor the temperature of one of more of brake pads 76 using one or more thermal sensors 92 to detect when at least one of brake pads 76 exceed a threshold temperature (102), generating NEA using OBIGGS 12 (104), and delivering NEA 16 to at least one of brake pads 76 (106) to remove heat from the brake pad.

In some examples, OBIGGS 12 may initiate the generation of NEA 16 in response to the temperature of the at least one of brake pads 76 exceeding the threshold temperature. For example, in response to detecting the temperature of the at least one brake pad 76 exceeding a threshold value during the braking procedure, OBIGGS 12 initiates the generation of NEA, controller 36 may operate NEA control valve 34, inlet control valve 22, or both to initiate the flow of NEA 16 delivered to brake pads 76. In other examples, OBIGGS 12 may be already in operation (e.g., to provide NEA 16 to fuel tanks 28, provide a base flow of NEA 16 to brake pads 76, or both) and controller 36 may then operate NEA control valve 34, inlet control valve 22, or both to either redirect the flow of NEA 16 or increase the flow of NEA 16 delivered to brake pads 76 in response to the detection of the threshold value.

Figure 5:
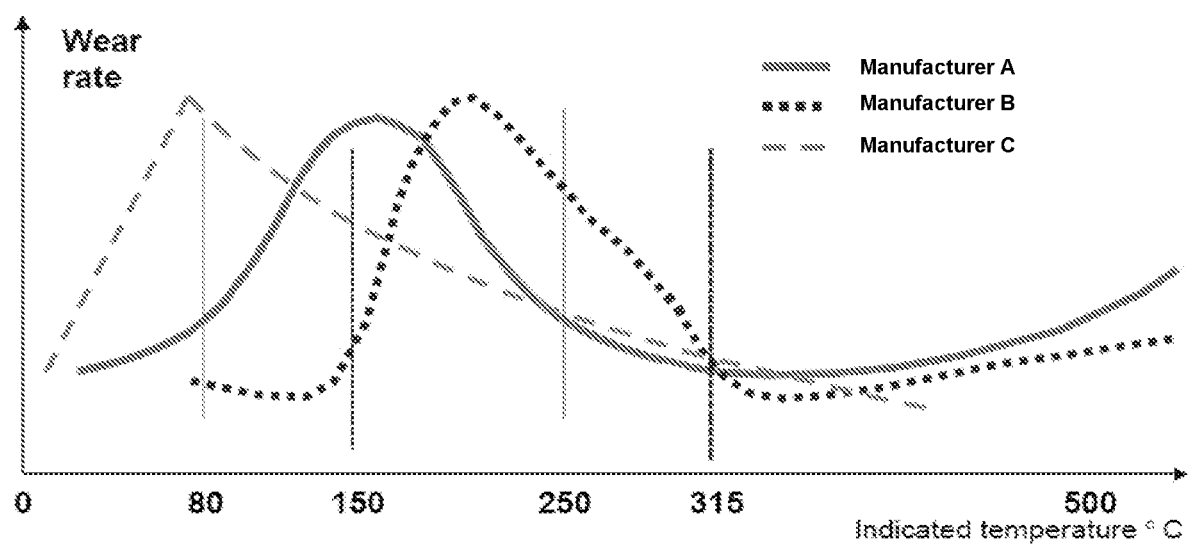
FIG. 5 is a diagram illustrating a comparative spectrum of the rate of carbon wear at different indicated temperatures for three commercially available C-C brake pads from three common manufactures.

The threshold temperature may be a pre-programmed temperature set based on the type of brake pad 76 used in wheel and brake assembly 30. For example, many commercially available brake pads 76 have an optimal temperature range that result in a reduced wear rate. FIG. 5 is a diagram illustrating a comparative spectrum of the rate of carbon wear at different indicated temperatures for three commercially available C-C brake pads from three common manufactures. As shown in the FIG. 5, the relationship between the disc temperature and wear rate of the disc is non-linear and is also different for different brake manufacturers. As one example, for Manufacturer B, the wear rate may be optimized if the temperature of brake pads 76 is maintained as less than about 150° C. or greater than about 315° C. In contrast, for Manufacture A, about 150° C. may represent the temperature that induces the greatest amount of wear on brake pads 76. Thus, an optimal temperature range for Manufacture A may be less than about 80° C. or greater than about 250° C.

In some examples, the threshold temperature limit may be set relatively low (e.g., about 60° C.) to maintain the temperature of brake pads 76 within a pre-programmed temperature range (e.g., less than 150° C. for manufacture B in FIG. 5). In some examples, controller 36 may be configured to monitor the change in temperature of brake pads 76 and adjust the volumetric flow rate of NEA 16 (106) via one or more of control valves 22 and 34 to increase the supply of cooling gas delivered to brake pads 76 to maintain the temperature of the brake pads within the pre-programmed temperature range.

In some examples, controller 36 may be configured to supply NEA 16 as a cooling gas to brake pads 76 while the temperature of brake pads 76 are between a first and a second pre-programmed threshold temperature (e.g., between 50° C. and 80° C. for Manufacturer A of FIG. 5). If brake pads 76 exceed the upper, second pre-programmed threshold temperature, controller 36 may reduce or discontinue the supply of NEA 16 to brake pads 76 to intentionally allow brake pads 76 to increase in temperature until they exceed a third pre-programmed threshold temperature (e.g., above 250° C. for Manufacturer A of FIG. 5), at which point controller 36 may continue the supply of NEA 16 to keep the temperature of brake pads 76 between the third pre-programmed threshold temperature and a fourth pre-programmed threshold temperature (e.g., between about 250° C. and about 350° C. for Manufacturer A of FIG. 5). By intentionally allowing brake pads 76 to increase in temperature over the range between the second and third threshold values, brake pad cooling system 10 may effectively reduce the amount of time that brake pads 76 operate at the temperatures that cause the maximum wear to occur. In some examples, rather than programming a series of threshold temperature values, the temperatures may be programmed based on one or more range temperatures in which brake pad cooling system 10 should supply NEA 16 as a cooling gas or reduce or discontinue the supply of NEA 16 to cool brake pads 76.

In some examples, in addition to being supplied as a cooling gas for brake pads 76 during active braking procedures, NEA 16 may also be used to help reduce the oxidative induced wear on brake pads 76 during the active braking procedures. For example, thermal and catalytic oxidation of brake pads 76 has been a common cause of degradation for brake pads 76 which is accelerated by increased temperatures. NEA 16 may be supplied to brake pads 76 to create a pseudo inert environment (e.g., reduced oxygen content) thereby reducing the amount of oxidation that occurs with brake pads 76. Thus, in some examples, brake pad cooling system 10 may supply at least a minimal or baseline amount of NEA 16 to brake pads 76 to produce a pseudo inert environment during active braking procedures regardless of the temperature of brake pads 76. In some examples, the minimal or baseline amount of NEA 16 may have a nominal effect on cooling brake pads 76.

Examples of different techniques for cooling brake pads 76 using NEA 16 have been described. In different examples, techniques of the disclosure may be implemented in different hardware, software, firmware or any combination thereof. In some examples, techniques of the disclosure may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, techniques of the disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A brake cooling system for a vehicle, the system comprising:
a brake assembly comprising at least one brake disc configured to decelerate the vehicle during an active braking procedure;
processing circuitry configured to monitor a temperature of the at least one brake disc;
an onboard inert gas generation system configured to receive air and produce a nitrogen enriched air (NEA) comprising at least about 90% nitrogen by volume;
a NEA supply conduit connected to the onboard inert gas generation system, the NEA supply conduit configured to deliver at least a portion of the NEA from the onboard inert gas generation system to the brake assembly as a cooling gas distributed over the at least one brake disc; and
a NEA control valve coupled to the NEA supply conduit, the processing circuitry configured to operate the NEA control valve to control a flow of the NEA passing through the NEA supply conduit,
wherein the processing circuitry, in response to detecting the temperature of the at least one brake disc exceeds a first threshold value during the active braking procedure, operates the NEA control valve to control the flow of the NEA passing through the NEA supply conduit and to deliver the at least the portion of the NEA as the cooling gas distributed over the at least one brake disc, and
wherein the processing circuitry, in response to detecting the temperature of the at least one brake disc exceeding a second threshold temperature greater than the first threshold temperature, reduces the supply of NEA to the at least one brake disc to allow the temperature to exceed a third threshold temperature.

2. The brake cooling system of claim 1, further comprising:
a supply source of the air;
an air supply conduit connected to the onboard inert gas generation system, the air supply conduit configured to deliver the air from the supply source to the onboard inert gas generation system; and
an inlet control valve coupled to the air supply conduit, the processing circuitry configured to operate the inlet control valve to control a flow of the air passing through the air supply conduit,
wherein the processing circuitry, in response to detecting the temperature of the at least one brake disc exceeding the first threshold value during the active braking procedure, operates the inlet supply valve to supply the air to the onboard inert gas generation system.

3. The brake cooling system of claim 1, further comprising a plurality of nozzles coupled to the NEA supply conduit, the plurality of nozzles configured to distribute the at least the portion of the NEA as the cooling gas over one or more surfaces of the at least one brake disc.

4. The brake cooling system of claim 1, wherein the NEA control valve comprises a variable flow control valve, and wherein the processing circuitry is configured to operate the NEA control valve to adjust a flow rate of the NEA to maintain the temperature of the at least one brake disc within a pre-programmed temperature range.

5. The brake cooling system of claim 1, wherein the processing circuitry is configured to operate the NEA control valve to control the flow of the NEA passing through the NEA supply conduit based on a plurality of user selectable pre-programed temperature ranges based on a type of brake disc installed in the brake assembly.

6. The brake cooling system of claim 1, wherein the brake assembly further comprises at least one thermal sensor associated with the at least one brake disc, the processing circuitry configured to detect the temperature of the at least one brake disc using the at least one thermal sensor.

7. The brake cooling system of claim 1, wherein the active braking procedure comprises at least one of a taxiing or landing procedure.

8. A method of active brake cooling for a vehicle, the method comprising:
performing an active braking procedure on a vehicle using a brake assembly comprising at least one brake disc configured to decelerate the vehicle during the active braking procedure;
detecting, by processing circuitry of a brake cooling system, a temperature of the at least one brake disc exceeding a first threshold temperature during the active braking procedure;
generating a nitrogen enriched air (NEA) comprising at least about 90% nitrogen by volume using an onboard inert gas generation system configured to receive air and produce the NEA;
delivering at least a portion of the NEA as a cooling gas distributed over the at least one brake disc in response to detecting by the processing circuitry the at least one brake disc exceeding the first threshold value, wherein the brake cooling system comprises a NEA supply conduit connected to the onboard inert gas generation system and a NEA control valve coupled to the NEA supply conduit, and wherein delivering the NEA comprises operating, by the processing circuitry, the NEA control valve to control a flow of the NEA passing through the NEA supply conduit to deliver the at least the portion of the NEA as the cooling gas to the at least one brake disc;
detecting, by the processing circuitry, the temperature of the at least one brake disc exceeding a second threshold temperature greater than the first threshold temperature; and
reducing the supply of NEA to the at least one brake disc to allow the temperature to exceed a third threshold temperature.

9. The method of claim 8, wherein the NEA control valve comprises a variable flow control valve, and wherein delivering the NEA further comprises operating, by the processing circuitry, the NEA control valve to adjust a flow rate of the NEA passing through the NEA supply conduit to maintain the temperature of the at least one brake disc within a pre-programmed temperature range.

10. The method of claim 9, further comprising selecting the pre-programmed range from a plurality of user selectable pre-programmed temperature ranges based on a type of brake disc installed in the brake assembly.

11. The method of claim 8, wherein delivering the NEA to the at least one brake disc comprises distributing the at least the portion of the NEA as the cooling gas over one or more surfaces of the at least one brake disc.

12. The method of claim 8, further comprising distributing at least some of the NEA as the cooling gas over the at least one brake disc during an entirety of the active braking procedure.

13. The method of claim 8, wherein delivering the at least the portion of the NEA over the at least one brake disc comprises removing heat from the at least one brake disc with the NEA.

14. The method of claim 8, wherein delivering the at least the portion of the NEA over the at least one brake disc comprises reducing the temperature of the at least one brake disc with the NEA.

15. The method of claim 8, wherein the onboard inert gas generation system is configured to generate the NEA with a temperature between about 50° C. and about 100° C.

16. A brake cooling system for a vehicle, the brake cooling system comprising:
an onboard inert gas generation system configured to purify nitrogen gas in a compressed air to produce a nitrogen enriched air (NEA) comprising at least about 90% nitrogen by volume;
a brake assembly comprising at least one brake disc configured to decelerate the vehicle during a landing procedure;
at least one thermal sensor associated with the at least one brake disc;
processing circuitry configured to monitor a temperature of the at least one brake disc using the at least one thermal sensor;
a NEA supply conduit connected to the onboard inert gas generation system, the NEA supply conduit configured to deliver at least a portion of the NEA from the onboard inert gas generation system to the brake assembly as a cooling gas distributed over the at least one brake disc; and
a variable flow NEA control valve coupled to the NEA supply conduit, the processing circuitry configured to operate the NEA control valve to regulate a flow rate of the NEA passing through the NEA supply conduit,
wherein the processing circuitry, in response to detecting the temperature of the at least one brake disc exceeds a first threshold value during the landing procedure, operates the NEA control valve to regulate the flow rate of the NEA passing through the NEA supply conduit and to deliver the at least the portion of the NEA as the cooling gas distributed over the at least one brake disc to remove heat from the at least one brake disc, and wherein the processing circuitry, in response to detecting the temperature of the at least one brake disc exceeding a second threshold temperature greater than the first threshold temperature, reduces the supply of NEA to the at least one brake disc to allow the temperature to exceed a third threshold temperature.

17. The system of claim 16, further comprising a plurality of nozzles coupled to the NEA supply conduit, the plurality of nozzles configured to distribute the at least the portion of the NEA over one or more surfaces of the at least one brake disc.

18. The brake cooling system of claim 16, further comprising:

a supply source of the compressed air;

an air supply conduit connected to the onboard inert gas generation system, the air supply conduit configured to deliver the compressed air from the supply source to the onboard inert gas generation system; and an inlet control valve coupled to the air supply conduit, the processing circuitry configured to operate the inlet control valve to control a flow of the compressed air passing through the air supply conduit, wherein the processing circuitry, in response to detecting the temperature of the at least one brake disc exceeding the first threshold value during the landing procedure, operates the inlet supply valve to supply the compressed air to the onboard inert gas generation system.

19. The brake cooling system of claim 1, wherein the at least the portion of the NEA delivered as the cooling gas to the at least one brake disc is not stored in a storage tank.

* * * * *